(12) United States Patent
Leufstedt

(10) Patent No.: US 12,022,795 B2
(45) Date of Patent: Jul. 2, 2024

(54) SEPARATOR AND A METHOD FOR SEPARATING MILK

(71) Applicant: Tetra Laval Holdings & Finance S.A., Pully (CH)

(72) Inventor: Max Leufstedt, Bjärred (SE)

(73) Assignee: Tetra Laval Holdings & Finance S.A., Pully (CH)

(*) Notice: Subject to any disclaimer, the term of this patent is extended or adjusted under 35 U.S.C. 154(b) by 274 days.

(21) Appl. No.: 16/954,677

(22) PCT Filed: Nov. 6, 2018

(86) PCT No.: PCT/EP2018/080233
§ 371 (c)(1),
(2) Date: Jun. 17, 2020

(87) PCT Pub. No.: WO2019/120730
PCT Pub. Date: Jun. 27, 2019

(65) Prior Publication Data
US 2020/0305382 A1 Oct. 1, 2020

(30) Foreign Application Priority Data
Dec. 19, 2017 (EP) .................................... 17208512

(51) Int. Cl.
*B04B 5/10* (2006.01)
*A01J 11/10* (2006.01)
(Continued)

(52) U.S. Cl.
CPC .............. *A01J 11/10* (2013.01); *A23C 7/046* (2013.01); *B04B 5/10* (2013.01); *B04B 11/04* (2013.01);
(Continued)

(58) Field of Classification Search
CPC . A01J 11/10; A23C 7/046; B04B 5/10; B04B 11/04; B04C 5/13; B04C 5/185; B04C 5/22; B04C 5/14
See application file for complete search history.

(56) References Cited

U.S. PATENT DOCUMENTS 2,756,878 A * 7/1956 Herkenhoff ............... B04C 5/13
209/732
2,781,907 A * 2/1957 Fontein ..................... B04C 5/28
209/733
(Continued)

FOREIGN PATENT DOCUMENTS

CA 2199023 A1 * 4/1996 ............... B04C 5/22
CA 2298968 A1 * 8/2000 ............... B04C 5/13
(Continued)

OTHER PUBLICATIONS

International Search Report for corresponding Application No. PCT/EP2018/080233, mailed Jan. 21, 2019.
(Continued)

*Primary Examiner* — Dung H Bui
(74) *Attorney, Agent, or Firm* — Renner, Otto, Boisselle & Sklar, LLP

(57) ABSTRACT

A separator for separating raw milk into a skimmed milk phase, a cream phase and an ejection phase that comprises solid impurities is disclosed. The separator includes an ejection port arranged at a periphery of the separator to eject the ejection phase. A cyclone is connected to the ejection port to receive and decelerate the ejection phase, and a vessel in fluid communication with an ejection phase outlet of the cyclone to receive and collect the ejection phase from the cyclone. The cyclone includes a port that is open to the atmosphere, such that pressure build-up created in the
(Continued)

cyclone when the ejection phase is ejected from the separator into the cyclone is released.

18 Claims, 4 Drawing Sheets

(51) Int. Cl.
*A23C 7/04* (2006.01)
*B04B 11/04* (2006.01)
*B04C 5/13* (2006.01)
*B04C 5/185* (2006.01)
*B04C 5/22* (2006.01)

(52) U.S. Cl.
CPC ............... *B04C 5/13* (2013.01); *B04C 5/185* (2013.01); *B04C 5/22* (2013.01)

(56) References Cited

U.S. PATENT DOCUMENTS

| | | | | |
|---|---|---|---|---|
| 3,437,205 | A * | 4/1969 | Condolios | B04C 5/185 |
| | | | | 210/112 |
| 4,074,622 | A * | 2/1978 | Niemeyer | A23C 9/1508 |
| | | | | 426/586 |
| 4,076,507 | A * | 2/1978 | Hauberg | B01D 50/00 |
| | | | | 95/271 |
| 4,390,350 | A * | 6/1983 | Palm | A23C 3/0375 |
| | | | | 422/26 |
| 4,405,265 | A * | 9/1983 | Powell | B04B 3/00 |
| | | | | 127/19 |
| 4,544,486 | A * | 10/1985 | Carroll | B04C 11/00 |
| | | | | 209/729 |
| 5,260,079 | A * | 11/1993 | Zettier | A23C 9/1508 |
| | | | | 99/452 |
| 5,312,466 | A * | 5/1994 | Taberlet | F04C 25/02 |
| | | | | 55/459.4 |
| 7,282,074 | B1 * | 10/2007 | Witter | B24B 55/06 |
| | | | | 451/87 |
| 10,040,077 | B1 * | 8/2018 | Sutton | B04B 15/08 |
| 2007/0082802 | A1 | 4/2007 | Klapper et al. | |
| 2008/0017595 | A1 | 1/2008 | Zettier et al. | |
| 2008/0092734 | A1 * | 4/2008 | Benner | B04C 5/185 |
| | | | | 95/271 |
| 2010/0065669 | A1 * | 3/2010 | Coles | B04C 5/081 |
| | | | | 241/39 |
| 2011/0094052 | A1 * | 4/2011 | Witter | B04C 5/185 |
| | | | | 15/347 |
| 2014/0079493 | A1 * | 3/2014 | Chau | B65G 53/60 |
| | | | | 406/173 |
| 2016/0341024 | A1 * | 11/2016 | Unnam | B01D 17/0208 |
| 2019/0022585 | A1 * | 1/2019 | Patrick | B01D 59/20 |
| 2019/0283042 | A1 * | 9/2019 | Kessler | C12M 33/10 |

FOREIGN PATENT DOCUMENTS

| | | | | |
|---|---|---|---|---|
| CN | 106179785 | A * | 12/2016 | ............... B03B 7/00 |
| DE | 102004038474 | B3 * | 12/2005 | ............... B04C 5/185 |
| EP | 1462179 | A1 * | 9/2004 | ........... B01D 50/002 |
| EP | 2353688 | A1 * | 8/2011 | ......... B01D 21/0024 |
| FR | 2590502 | A1 * | 5/1987 | ............. B04C 5/185 |
| GB | 2 106 368 | A | 4/1983 | |
| KR | 101358338 | B1 * | 2/2014 | ............... B04B 5/10 |
| NL | 8900171 | A * | 8/1989 | ............... A23C 7/046 |
| WO | WO-9101810 | A1 * | 2/1991 | ............... B04C 5/14 |
| WO | 2005/086994 | A1 | 9/2005 | |
| WO | WO-2007019601 | A1 * | 2/2007 | ............... B04C 5/04 |
| WO | WO-2016096106 | A1 * | 6/2016 | ............... A01J 11/00 |

OTHER PUBLICATIONS

Extended European Search Report for corresponding Application No. 17208512.8, dated Jun. 11, 2018.
Kirschenmann B., "Bactofugation, Bactofugat Und Bactofugenschhlamm", Dmz. Lebensmittelindustrie Und Milchwissenschaft, Volkswirtschaftlicher Verlag Gmgh., Muchen, DE, vol. 110, No. 21, May 24, 1989, pp. 654, 657, XP000007945 ISSN: 0938-9369 (cited in International Search Report and Extended European Search Report).

* cited by examiner

SEPARATOR AND A METHOD FOR SEPARATING MILK

TECHNICAL FIELD

The present invention relates to a separator for separating raw milk into a skimmed milk phase, a cream phase and an ejection phase that comprises solid impurities, and a related method.

BACKGROUND

Separators for separating raw milk into different phases of varying density under the influence of a centrifugal force are called centrifugal separators. The raw milk is introduced in a rotating disc stack of the centrifugal separator. Under the influence of the centrifugal force heavier sediment and lighter fat globules in the raw milk begin to settle radially outwards respectively inwards in the separation channels according to their density relative to that of skimmilk. The high-density solid impurities in the milk will settle outwards towards the periphery of the separator and collect in a sediment space. The solids that collect in the sediment space may comprise straw and hairs, udder cells, white blood corpuscles (leucocytes), red blood corpuscles, bacteria, etc. The cream, i.e. the fat globules, has a lower density than the skimmilk and therefore moves inwards in the channels, towards the separator's axis of rotation. The cream continues to an axial outlet and the skimmilk moves outwards to the space outside the disc stack and from there to a skimmilk outlet. FIG. 1 is a schematic illustration of how raw milk (RM) enters a centrifuge bowl 11 of a separator 10, and the subsequent separation of the skimmilk phase (SM) and the cream phase (CR) at the top of the centrifuge bowl 11, as well as the ejection of solid impurities in an ejection phase (SI) from the periphery of the centrifuge bowl 11. The ejection phase (SI) is decelerated in a cyclone 12 and conveyed to a gathering vessel 14 via a pipe 13. A pump 15 is connected to the vessel 14 to expel the ejection phase (SI) from the gathering vessel 14. Previous separators require considerable maintenance, both in terms of sustaining the intended function over the expected life time, and to satisfy various hygiene requirements. Thus, considerable resources are required for these purposes, as well as factory real estate due to the typically bulky setup of such previous separators.

It would thus be advantageous with an improved separator, in particular allowing for avoiding at least some of the above-mentioned problems and compromises, including providing for a more efficient handling of the ejection phase of raw milk impurities ejected in a cyclone of the separator. Additionally, more hygienic handling of the ejection phase, less maintenance, and a smaller foot-print of such separator would be desired.

SUMMARY

Accordingly, examples of the present invention preferably seek to mitigate, alleviate or eliminate one or more deficiencies, disadvantages or issues in the art, such as the above-identified, singly or in any combination by providing a device according to the appended patent claims.

According to a first aspect a separator for separating raw milk into a skimmed milk phase, a cream phase and an ejection phase that comprises solid impurities is provided. The separator comprises a centrifuge bowl comprising an inlet for the raw milk and outlets for the skimmed milk phase and the cream phase. The centrifuge bowl comprises an ejection port arranged at a periphery of the centrifuge bowl to eject the ejection phase from the centrifuge bowl. The separator comprises a cyclone connected to the ejection port to receive and decelerate the ejection phase ejected from the centrifuge bowl, and a vessel in fluid communication with an ejection phase outlet of the cyclone to receive and collect the ejection phase from the cyclone. The cyclone comprises a port that is open to the atmosphere, such that pressure build-up created in the cyclone when the ejection phase is ejected from the centrifuge bowl into the cyclone is released.

According to a second aspect a method for separating raw milk into a skimmed milk phase, a cream phase and an ejection phase that comprises solid impurities is provided. The method comprises receiving the raw milk into a centrifuge bowl, ejecting the ejection phase from the centrifuge bowl through an ejection port, receiving and decelerating the ejection phase ejected from the centrifuge bowl in a cyclone connected to the ejection port, and releasing pressure build-up created in the cyclone, when the ejection phase is ejected from the centrifuge bowl into the cyclone, through a port in the cyclone that is open to the atmosphere.

Further examples of the invention are defined in the dependent claims, wherein features for the first aspect may be implemented for the second aspect, and vice versa.

Using a cyclone with a port that is open to the atmosphere is advantageous in that it reduces pressure surges, and thereby vibrations, that may be transferred from the cyclone.

Some examples of the disclosure provide for a more efficient handling of raw milk impurities ejected in a cyclone of a separator.

Some examples of the disclosure provide for a separator having a smaller foot-print.

Some examples of the disclosure provide for a more hygienic handling of raw milk impurities ejected in a cyclone of a separator.

Some examples of the disclosure provide for a more robust separator.

Some examples of the disclosure provide for a separator requiring less maintenance.

Some examples of the disclosure provide for increasing the life-time of a separator.

BRIEF DESCRIPTION OF THE DRAWINGS

These and other aspects, features and advantages of which examples of the invention are capable of will be apparent and elucidated from the following description of examples of the present invention, reference being made to the accompanying drawings, in which.

DETAILED DESCRIPTION

Figure 1:
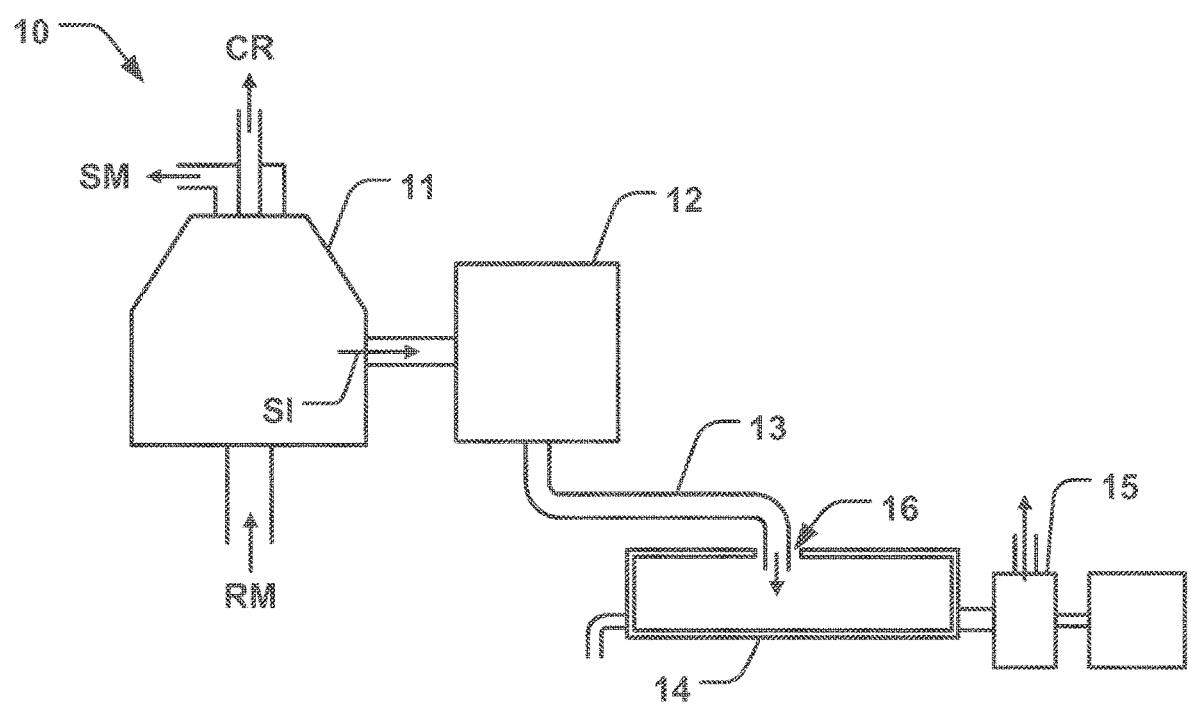
FIG. 1 is a schematic illustration of a separator for separating raw milk into a skimmed milk phase, a cream phase and an ejection phase (SI), according to the prior art.

Specific examples of the invention will now be described with reference to the accompanying drawings. This invention may, however, be embodied in many different forms and should not be construed as limited to the examples set forth herein; rather, these examples are provided so that this disclosure will be thorough and complete, and will fully convey the scope of the invention to those skilled in the art. The terminology used in the detailed description of the examples illustrated in the accompanying drawings is not intended to be limiting of the invention. In the drawings, like numbers refer to like elements.

Figure 2:
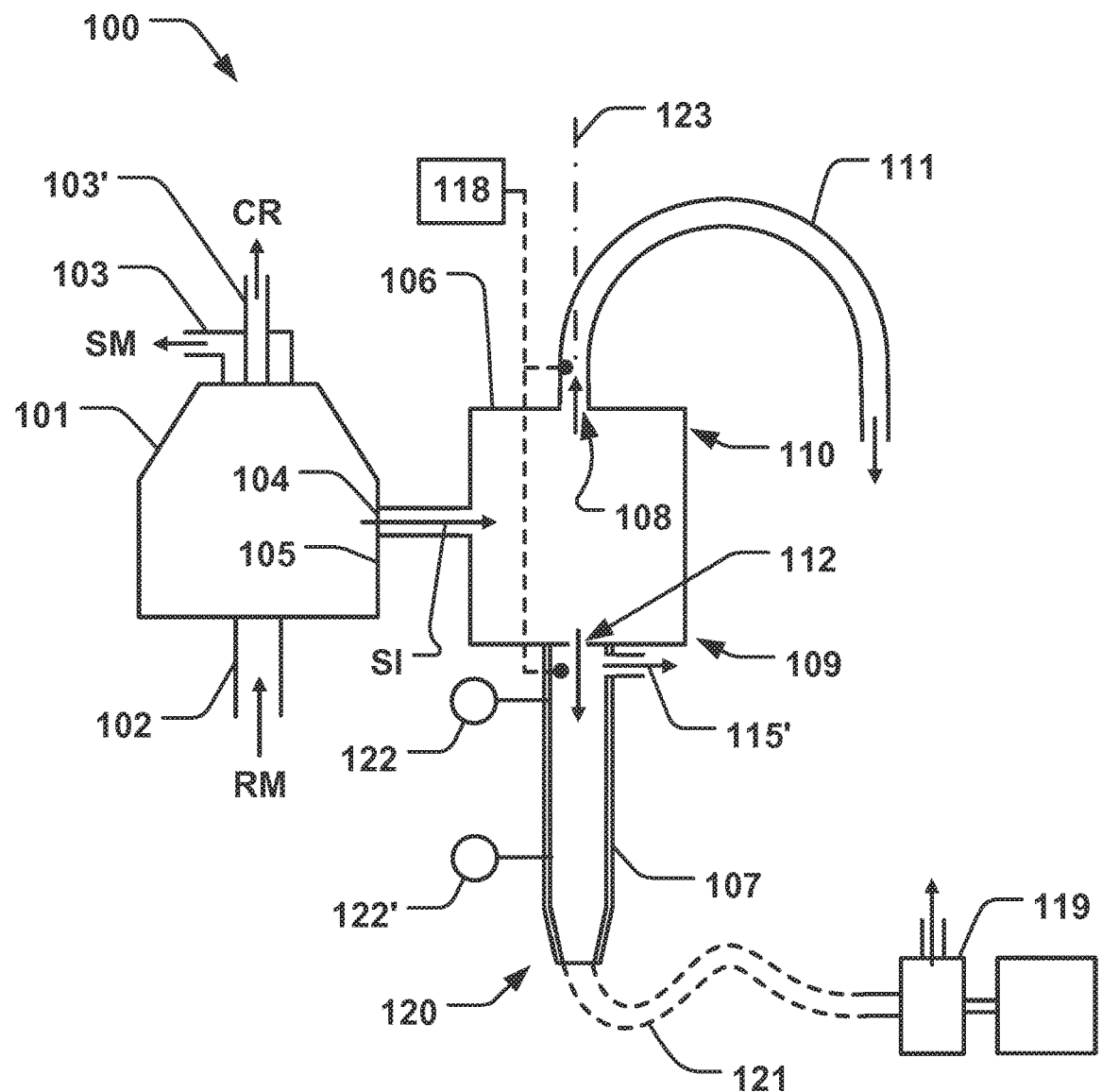
FIG. 2 is a schematic illustration of a separator comprising a centrifuge bowl, a cyclone, and a vessel, according to examples of the disclosure.

FIG. 2 is a schematic illustration of a separator 100 for separating raw milk (RM) into a skimmed milk phase (SM), a cream phase (CR) and an ejection phase (SI) that comprises solid impurities (SI). The separator 100 comprises a centrifuge bowl 101. The centrifuge bowl 101 comprises an inlet 102 for the raw milk (RM), and outlets 103, 103', for the skimmed milk phase (SM) and the cream phase (CR), respectively. The centrifuge bowl 101 comprises an ejection port 104 arranged at a periphery 105 of the centrifuge bowl 101. The ejection port 104 ejects the ejection phase (SI) from the centrifuge bowl 101. The ejection port 104 may be configured to open for a short period of time, and with a predefined frequency so that the impurities collected at the periphery, i.e. at the sediment space, are regularly emptied from the centrifuge bowl 101. The separator 100 comprises a cyclone 106 connected to the ejection port 104 to receive and decelerate the ejection phase (SI) ejected from the centrifuge bowl 101. Thus, the cyclone 106 absorbs the chock of energy of the ejection phase (SI) leaving the centrifuge bowl 101 via the ejection port 104. The ejection port 104 may be angled in a tangential direction of the cyclone 106 so that the ejection phase (SI) may be decelerated with a trajectory along the inner curvature of the wall of the cyclone 106, which in principle has the general shape of a cylinder.

Figure 3:
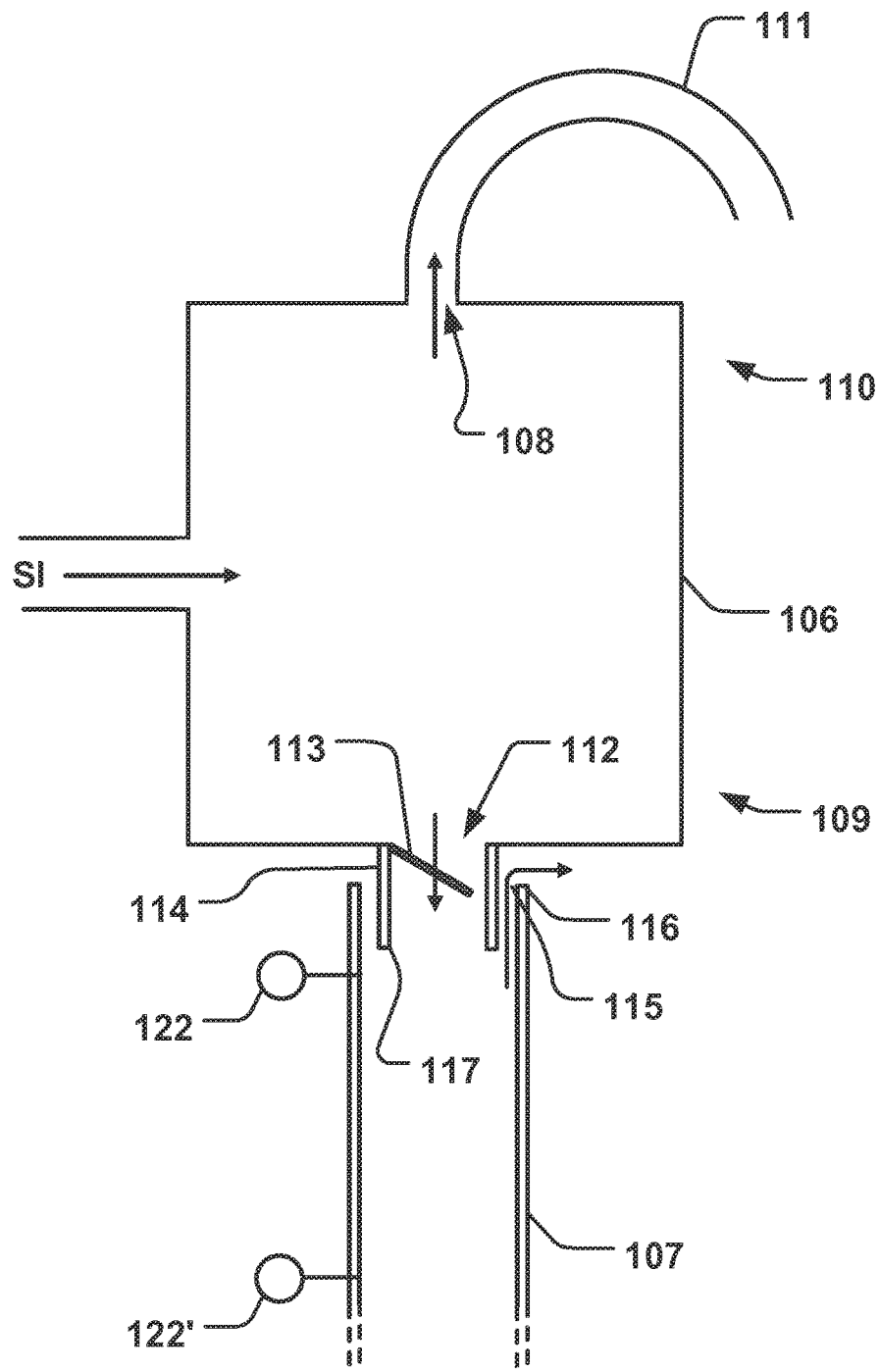
FIG. 3 is a schematic illustration of a cyclone of a separator, according to examples of the disclosure.

The separator 100 comprises a vessel 107 in fluid communication with an ejection phase outlet 112 of the cyclone 106 to receive and collect the ejection phase (SI) from the cyclone 106. Hence, the ejection phase (SI) is gathered in the vessel 107 after being decelerated in the cyclone 106. The vessel 107 may be in fluid communication with the cyclone 106 by being attached to the cyclone 106 as schematically illustrated in FIG. 2, or otherwise arranged so that the fluid ejection phase (SI) can flow from the cyclone 106 into the vessel 107, e.g. as illustrated in FIG. 3 where the ejection phase outlet 112 extends into at least part of the vessel 107.

Herein, "fluid communication" between two parts, such as the cyclone 106 and the vessel 107, means that the parts are arranged such that liquid can flow between the parts. The parts may be either directly connected to each other, or may be located adjacent each other with a spacing in between each other, as long as liquid can flow between the parts.

The cyclone 106 comprises a port 108 (also referred to as a pressure release port) that is open to the atmosphere, such that pressure build-up created in the cyclone 106 when the ejection phase (SI) is ejected from the centrifuge bowl 101 into the cyclone 106 is released. The port 108 being open to the atmosphere should be construed as the port 108 being in gaseous communication with a surrounding space into which a volume of gas of the cyclone 106 may be released to minimize or lower an momentaneous increase of pressure in the cyclone 106 as the ejection phase (SI) is ejected into the cyclone 106. The short burst of impurities ejected into the cyclone 106 creates a pressure pulse in the interior of cyclone 106. Having a port 108 in the cyclone 106 that is open to the atmosphere, so that the pressure build-up created by the pulse can escape through the port 108 provides for reducing the pressure fluctuations absorbed by the cyclone 106 itself. Vibrations in the cyclone 106 associated with such fluctuations can thereby be reduced. A reduced amount of vibrations in the cyclone 106 provides for a facilitated handling of the ejection phase (SI) and a more compact separator 100. For example, in prior art separator systems 10, as illustrated in FIG. 1, the vessel 14 into which the ejection phase (SI) is conveyed must have a substantial part of its volume sized to absorb the pressure pulse ejected from the cyclone 12, via pipe 12 into the vessel 14. The volume of vessel 14 must thus be substantially larger in previous solutions, e.g. twice the volume of the vessel 107 in the presently described separator 100, e.g. 80 liters compared to 40 liters. The space saved allows for a more flexible placement of the separator 100, allowing e.g. easier adaptation to different production lines and modifications if needed. Furthermore, due to the significant vibrations in the cyclone 12 of previous solutions and components connected thereto such as the conveyor pipe 13, it is necessary to have a space 16 at the opening of the vessel 14 where the pipe 13 can oscillate due to such vibrations. The fluid ejection phase (SI) may escape through such space 16, due to the turbulence created in the fluid in the vessel 14 from the pressure pulse that is ejected into the vessel 14. This requires more maintenance and is less hygienic.

Having a cyclone 106 with a port 108 open to the atmosphere as described above thus provides for absorbing pressure pulses earlier in the separator 100, avoiding the issues from pressure gradients and vibrations downstream in the separator system as encountered in previous solutions. A cyclone 106 with a port 108 open to the atmosphere thus provides for a more hygienic handling of raw milk impurities ejected in the cyclone 106, and a more compact separator 100. The reduced vibrations also provide for minimizing the risk of mechanical failures and increasing the life time of the separator 100. A more robust separator 100 requiring less maintenance is provided.

Figure 4:
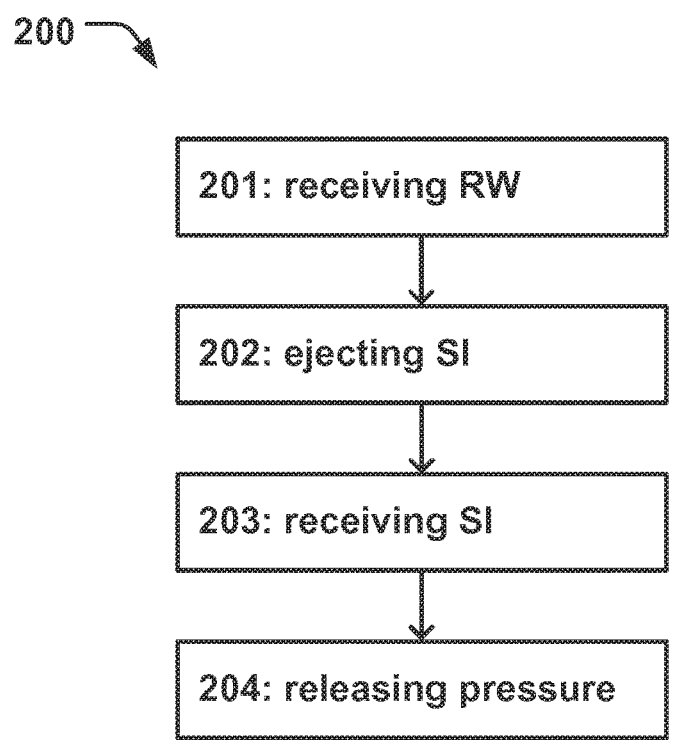
FIG. 4 is a flowchart of a method for separating raw milk into a skimmed milk phase, a cream phase and an ejection phase, according to examples of the disclosure.

FIG. 4 illustrates a flow chart of a method 200 for separating raw milk (RM) into a skimmed milk phase (SM), a cream phase (CR) and an ejection phase (SI) that comprises solid impurities (SI). The order in which the steps of the method 200 are described and illustrated should not be construed as limiting and it is conceivable that the steps can be performed in varying order. The method 200 comprises receiving 201 the raw milk (RM) into a centrifuge bowl 101, and ejecting 202 the ejection phase (SI) from the centrifuge bowl 101 through an ejection port 104. The method 200 further comprises receiving 203 and decelerating the ejection phase (SI) ejected from the centrifuge bowl 101 in a cyclone 106 connected to the ejection port 104, and releasing 204 pressure build-up created in the cyclone 106, when the ejection phase (IS) is ejected from the centrifuge bowl 101 into the cyclone 106, through a port 108 in the cyclone 106 that is open to the atmosphere, as described above. The method 200 thus provides for the advantageous benefits as described above in relation to the separator 100 and FIG. 2. I.e. the method 200 provides for a more efficient handling of the ejection phase (SI) of raw milk impurities ejected in a cyclone 106 of a separator 100, a more hygienic handling of the ejection phase (SI), less maintenance, and a smaller foot-print of such separator 100.

Returning to the examples of FIGS. 2 and 3, the vessel 107 may be arranged at a lower part 109 of the cyclone 106, and the port 108 may be arranged in an opposite, upper part 110 of the cyclone 106. The ejection phase (SI) may thus be collected at the lower part 109 without interfering with the gas pressure outlet via the port 108. The risk of obstructing the port 108 may thus be minimized and a more robust performance can be ascertained. The port 108 may be arranged concentrically in the cyclone 106, i.e. at or adjacent a center axis 123 of the cyclone, as schematically illustrated in FIG. 2. The radial distance between the port 108 and the periphery of the cyclone 106 where the ejection port 104 is connected may thus be maximized. Ejection of the solid impurities in the ejection phase (SI) at the periphery of the cyclone 106 has thus a minimized risk of interfering with the port 108. It is conceivable however that the port 108 may be arranged at other portions of the cyclone 106 while allowing for release of pressure-build up as described. For example, the port 108 may be arranged at a side portion of the cyclone 106 while the ejection phase (SI) is prevented from flowing to the port 108 by a shielding structure such as a flange (not shown) at the inside of the cyclone 106.

The vessel 107 may be vertically aligned with respect to the cyclone 106, underneath the cyclone 106 so that the ejection phase (SI) can gather in the vessel 107 under the influence of the gravitational force, as schematically illustrated in FIGS. 2 and 3 (FIG. 3 shows only a section of the vessel 107). This provides for a compact separator 100, since the ejection phase (SI) can flow directly into the vessel 107 from the cyclone 106. The absent or minimized vibrations of the cyclone 106 allows accordingly for a facilitated and more flexible positioning of the vessel 107 relative the cyclone 106, due to the alleviated need for vibration accommodating structures or pressure absorbing volume in the vessel itself. The reduced foot-print of the separator 100 provides for easy and resource efficient integration in a production line. FIGS. 2 3 show the vessel 107 concentrically aligned with respect to a center axis 123 of the cyclone 106. The vessel 107 may however be arranged at other portions of the cyclone 106 while allowing for the ejection phase (SI) to be collected in the vessel 107 under the influence of the gravitational force, such as off-center to central axis 123.

The separator 100 may comprise a conduit 111 connected to the port 108, as schematically illustrated in FIGS. 2 and 3. The conduit 111 may be deflected from the direction 123 parallel to the center axis 123 of the cyclone 106 (overlapping in the example of FIG. 2 due to the concentric arrangement of the port 108). In case any fluid of the ejection phase (SI) would exit the cyclone 106 via the port 108, it will be deflected via the conduit 111 and collected. This further facilitates a hygienic handling of the ejection phase (SI) in the separator 100. The conduit 111 still provides for an opening to the atmosphere for release of the pressure pulses created in the cyclone 106.

The through-flow area of the ejection phase outlet 112 of the cyclone 106 may be smaller than the through-flow area the port 108. This provides for facilitating the release of the pressure pulse via the port 108, minimizing vibrations of the cyclone 106, while the ejection phase (SI) can flow into the vessel 107 via the ejection phase outlet 112 with a minimal impact from the pressure pulse escaping through the port 108. The reduced through-flow area of the ejection phase outlet 112, compared to the through-flow area the port 108, is schematically illustrated in FIG. 2. The through-flow area of the ejection phase outlet 112 has also been reduced in the example of FIG. 3, via a flow restrictor 113 as described below.

In one example, the through-flow area of the ejection phase outlet 112 of the cyclone 106 may be less than 20% of the through-flow area the port 108. This may provide for a particularly efficient dampening of the pressure pulse as well as sufficient flow rate of the ejection phase (SI) into the vessel 107. It is conceivable however that the ratios between the through-flow areas of the ejection phase outlet 112 and the port 108 may assume other values for optimization to varying conditions and arrangements of the separator 100. The through-flow area of the ejection phase outlet 112 of the cyclone 106 may e.g. be less than 10% or less than 5% of the through-flow area the port 108 in some examples.

The ejection phase outlet 112 may comprise a flow restrictor 113 that is arranged to set a flow of the ejection phase (SI) past the ejection phase outlet 112 to a predefined rate. FIG. 3 shows a schematic example of such flow restrictor 113. The flow restrictor 113 may have varying shapes and sizes for achieving a desired flow rate of the ejection phase (SI) into the vessel 107. As elucidated above, such optimization allows for attaining efficient dampening of the pressure pulse as well as the necessary flow rate of the ejection phase (SI) into the vessel 107.

The ejection phase outlet 112 may comprise a flange 114 that extends into at least a part of the vessel 107, as schematically illustrated in the example of FIG. 3. It may thus be assured that the ejection phase (SI) leaving the cyclone 106 indeed is flowing into the vessel 107, even if there would be a horizontal relative movement between the cyclone 106 and the vessel 107. The flange 114 may be an annular structure surrounding the ejection phase outlet 112. It is conceivable that other structures may be arranged at the ejection phase outlet 112, extending into at least part of the vessel 107, that limits a displacement of the vessel 107 and the cyclone 106 relative to each other. A flange 114 may however be particularly advantageous in ensuring that the ejection phase (SI) is transported into the vessel 107 as desired.

The separator 100 may comprise an overflow passage 115, open to the atmosphere, and arranged between the flange 114 and the vessel 107, thereby allowing the ejection phase (SI) to leave the vessel 107 via the overflow passage 115. FIG. 3 schematically illustrates such overflow passage 115, that allows the ejection phase (SI) to be expelled from the vessel 107 in case of a malfunction so that the vessel 107 is not emptied as needed. The risk of having the ejection phase (IS) accumulating in the cyclone 106 is thus avoided. The latter can be particularly harmful during ejection of the ejection phase (SI) into the cyclone 106. The overflow passage 115 thus provides for increasing the safety during operation of the separator 100. The overflow passage 115 being open to the atmosphere should be construed as being open to a surrounding space into which the ejection phase (SI) may flow so that a maximum level of ejection phase (SI) fluid in the vessel 107 is not exceeded, i.e. up to the vertical position of the overflow passage 115.

The overflow passage 115 may be arranged vertically above a lowermost part 117 of the flange 114, as schematically illustrated in FIG. 3. An uppermost part 116 or the vessel 107 is located vertically above a lowermost part 117 of the flange 114. The risk of having the ejection phase (SI) flowing out from the overflow passage 115 when the vessel 107 is in not filled to the vertical position of the overflow passage 115 may thus be minimized. I.e. a flow directly from the ejection phase outlet 112 to the overflow passage 115 is prevented. This further facilitates the hygienic handling of the ejection phase (SI) in the separator 100.

The cyclone 106 and the flange 114 at the ejection phase outlet 112 may be freely moveable relative the vessel 107. Hence, the flange 114 and vessel 107 may be dimensioned to provide a space between the flange 114 and the vessel 107 that allows for relative movement therebetween, as well as space for the overflow passage 115 mentioned above. Any vibrations may thus be accommodated in the mentioned space, which further minimizes the risk of any undesired oscillations downstream the cyclone 106.

An overflow passage 115' of the vessel 107 is also illustrated in the example of FIG. 2. In this case, when the vessel 107 is connected to the cyclone 106, the overflow passage 115' may comprise an opening in the vessel 107 adjacent and below the ejection phase outlet 112 in the vertical direction.

The separator 100 may comprise a cleaning unit 118 arranged adjacent the port 180 and the ejection phase outlet 112, as schematically illustrated in FIG. 2. This allows for efficient cleaning of the separator 100 and minimized risk of accumulation of unwanted contaminants. The cleaning unit 118 may comprise a first and second cleaning device, such as a CIP (cleaning in place device). The CIP device may comprise a rotating device configured to eject a cleaning fluid e.g. water around its vicinity. The first and/or second cleaning device may be arranged less than 20 cm from the port 180 and/or the ejection phase outlet 112, to provide for a particularly efficient cleaning operation. The cleaning device may be used for the embodiment shown in FIG. 3.

The separator 100 may comprise a pump 119 connected to the vessel 107 at a lower part 120 thereof for expelling the ejection phase (SI) from the vessel 107, as schematically illustrated in FIG. 2. The pump 119 may be connected to the vessel 107 via a flexible conduit 121. Any vibrations may thus be further effectively damped and absorbed by the flexible conduit 121 in case the vessel 107 is directly attached to the cyclone 106. The embodiment of FIG. 3 can reduce or even eliminate vibrations from the cyclone 106 to the vessel 107. Still, the flexible conduit may be used also for the FIG. 3 embodiment.

The vessel 107 may comprise a sensor 122, 122', arranged to detect a level of ejection phase (SI) in the vessel 107 to trigger expulsion of the ejection phase (SI) from the vessel 107 via a pump 119 connected to the vessel 107. FIGS. 1-2 schematically illustrate such sensor 122, 122', being arranged at a lower and upper level of the vessel 107. Hence, the pump 119 may be triggered for expulsion of the ejection phase (SI) from the vessel when reaching the upper sensor 122 in the vertical direction of the vessel. An efficient and safe operation of the separating unit 100 may thus be further ensured.

The present invention has been described above with reference to specific examples. However, other examples than the above described are equally possible within the scope of the invention. The different features and steps of the invention may be combined in other combinations than those described. The scope of the invention is only limited by the appended patent claims.

The invention claimed is:

1. A separator for separating raw milk into a skimmed milk phase, a cream phase and an ejection phase that comprises solid impurities, the separator comprises:
   a centrifuge bowl comprising
      an inlet for the raw milk and outlets for the skimmed milk phase and the cream phase,
      an ejection port arranged at a periphery of the centrifuge bowl to eject the ejection phase from the centrifuge bowl,
   a cyclone connected to the ejection port to receive and decelerate the ejection phase ejected from the centrifuge bowl, the cyclone comprising an ejection phase outlet and a pressure release port, and
   a vessel in fluid communication with the ejection phase outlet of the cyclone to receive and collect the ejection phase from the cyclone,
   wherein the cyclone is configured such that, when the cyclone is operating to receive the ejection phase from the centrifuge bowl:
   (i) the pressure release port is open directly to the atmosphere to release pressure build-up created in the cyclone when the ejection phase is ejected from the centrifuge bowl into the cyclone, and
   (ii) the through-flow area of the ejection phase outlet of the cyclone is smaller than the through-flow area of the pressure release port at least during the time when the cyclone receives the ejection phase from the centrifuge bowl to thereby facilitate the release of the pressure build-up and minimize vibrations of the cyclone.

2. The separator according to claim 1, wherein the vessel is arranged at a lower part of the cyclone, and the pressure release port is arranged in an opposite, upper part of the cyclone.

3. The separator according to claim 1, comprising a conduit connected to the pressure release port, wherein the conduit is deflected from a direction that is parallel to the center axis of the cyclone.

4. The separator according to claim 1, wherein the through-flow area of the ejection phase outlet of the cyclone is less than 20% of the through-flow area the pressure release port.

5. The separator according to claim 1, wherein the ejection phase outlet comprises a flow restrictor that is arranged to set a flow of the ejection phase past the ejection phase outlet to a predefined rate.

6. The separator according to claim 1, wherein the vessel is vertically aligned with respect to the cyclone, underneath the cyclone so that the ejection phase can gather in the vessel under the influence of the gravitational force.

7. The separator according to claim 1, wherein the ejection phase outlet comprises a flange that extends into at least a part of the vessel.

8. The separator according to claim 7, wherein an overflow passage that is open to the atmosphere is arranged between the flange and the vessel, such that the overflow passage allows ejection phase to leave the vessel via the overflow passage.

9. The separator according to claim 8, wherein the overflow passage is arranged vertically above a lowermost part of the flange.

10. The separator according to claim 8, wherein the cyclone and the flange at the ejection phase outlet are freely moveable relative the vessel.

11. The separator according to claim 1, comprising a cleaning unit arranged adjacent the pressure release port and the ejection phase outlet.

12. The separator according to claim 1, comprising a pump connected to the vessel at a lower part thereof for expelling the ejection phase from the vessel, wherein the pump is connected to the vessel via a flexible conduit.

13. The separator according to claim 1, wherein the vessel comprises a sensor arranged to detect a level of ejection phase in the vessel to trigger expulsion of the ejection phase from the vessel via a pump connected to the vessel.

14. The separator according to claim 1, wherein (ii) the through-flow area of the ejection phase outlet of the cyclone is smaller than the through-flow area of the pressure release port at least during the time when (a) the cyclone receives the ejection phase from the centrifuge bowl and (b) both the ejection phase outlet and the pressure release port are open, to thereby facilitate the release of the pressure build-up and minimize vibrations of the cyclone.

15. The separator according to claim 1, wherein the through-flow area of the ejection phase outlet is defined by an opening in a flow restrictor.

16. A method for separating raw milk into a skimmed milk phase, a cream phase and an ejection phase that comprises solid impurities, the method comprises:
   receiving the raw milk into a centrifuge bowl,
   ejecting the ejection phase from the centrifuge bowl through an ejection port,
   receiving and decelerating the ejection phase ejected from the centrifuge bowl in a cyclone connected to the ejection port,
   receiving and collecting the ejection phase from the cyclone through an ejection phase outlet of the cyclone, and
   releasing pressure build-up created in the cyclone, when the ejection phase is ejected from the centrifuge bowl into the cyclone, through a pressure release port in the cyclone that is open directly to the atmosphere,
   wherein the through-flow area of the ejection phase outlet of the cyclone is smaller than the through-flow area the pressure release port at least during the time when the cyclone receives the ejection phase from the centrifuge bowl, thereby facilitating the release of the pressure build-up and minimize vibrations of the cyclone.

17. The method according to claim 16, wherein (ii) the through-flow area of the ejection phase outlet of the cyclone is smaller than the through-flow area of the pressure release port at least during the time when (a) the cyclone receives the ejection phase from the centrifuge bowl and (b) both the ejection phase outlet and the pressure release port are open, to thereby facilitate the release of the pressure build-up and minimize vibrations of the cyclone.

18. The method according to claim 16, wherein the through-flow area of the ejection phase outlet is defined by an opening in a flow restrictor.

* * * * *